US010310637B2

(12) United States Patent
Zhu

(10) Patent No.: US 10,310,637 B2
(45) Date of Patent: Jun. 4, 2019

(54) CONTROLLING AN ELECTRONIC DEVICE TO END A RUNNING APPLICATION

(71) Applicant: Lenovo (Beijing) Limited, Beijing (CN)

(72) Inventor: Xiaohu Zhu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 6 days.

(21) Appl. No.: 15/087,603

(22) Filed: Mar. 31, 2016

(65) Prior Publication Data

US 2017/0177103 A1 Jun. 22, 2017

(30) Foreign Application Priority Data

Dec. 21, 2015 (CN) .......................... 2015 1 0965377

(51) Int. Cl.

| | |
|---|---|
| ***G06F 3/0354*** | (2013.01) |
| ***G06F 3/0488*** | (2013.01) |
| ***G06F 3/041*** | (2006.01) |
| ***G06F 3/0346*** | (2013.01) |
| *G06F 3/01* | (2006.01) |

(52) U.S. Cl.

CPC ........ *G06F 3/03547* (2013.01); *G06F 3/0346* (2013.01); *G06F 3/04883* (2013.01); *G06F 3/017* (2013.01)

(58) Field of Classification Search

CPC ................. G06F 3/04883; G06F 3/017; G06F 2203/04803; G06F 3/0482; G06F 3/03547; G06F 3/04847; G06F 3/04886; G06F 3/0484

See application file for complete search history.

(56) References Cited

U.S. PATENT DOCUMENTS

| | | | | |
|---|---|---|---|---|
| 8,890,825 B2 * | 11/2014 | Bose | G06F 3/0416 | 345/173 |
| 2007/0132724 A1 * | 6/2007 | Muranaka | G06F 1/1626 | 345/156 |
| 2013/0215040 A1 * | 8/2013 | Bose | G06F 3/0416 | 345/173 |
| 2014/0078178 A1 * | 3/2014 | Li | G09G 5/00 | 345/659 |
| 2015/0269944 A1 | 9/2015 | Wang | | |
| 2016/0091308 A1 * | 3/2016 | Oliaei | G01B 17/00 | 367/89 |
| 2016/0124532 A1 * | 5/2016 | Wolff | G06F 3/04883 | 345/157 |

FOREIGN PATENT DOCUMENTS

| | | |
|---|---|---|
| CN | 104216563 A | 12/2014 |
| CN | 104216639 A | 12/2014 |
| CN | 104820619 A | 8/2015 |

* cited by examiner

*Primary Examiner* — Xuemei Zheng

(74) *Attorney, Agent, or Firm* — Ference & Associates LLC

(57) ABSTRACT

One embodiment provides a method of controlling an electronic device including: activating one or more applications for display on a display unit; detecting a motion of an input device in relation to the electronic device, wherein the motion is in correspondence with a user instruction to end the running one or more applications; and ending the running of the one or more applications. Other aspects are described and claimed.

6 Claims, 11 Drawing Sheets

CONTROLLING AN ELECTRONIC DEVICE TO END A RUNNING APPLICATION

CLAIM FOR PRIORITY

This application claims priority to Chinese Application No. 201510965377.5, filed on Dec. 21, 2015, which is fully incorporated by reference herein.

FIELD

The subject matter described herein relates to the field of computer technology, more specifically, it relates to an information processing method and electronic device.

BACKGROUND

With the ceaseless development of science and technology, electronic technology has also seen rapid development. Electronic products are constantly increasing in type and function, and people are benefiting from the various conveniences brought by these developments. People can now enjoy a comfortable life brought by the technological developments embodied in these various types of electronic devices. For example, electronic devices such as cell phones, tablet computers, and the like have become an essential part of people's lives.

At present, when using an electronic device, users can return to the home screen interface from the interface of a currently displayed application through a return key; however, when doing so, the application is not closed, but continues running in the background. Thus, if the user wants to end the application completely, a multi-tasking list needs to be invoked through other operations, and then the application to be closed must be selected in the multi-tasking list and then closed. As can be seen, the existing approach to closing applications is rather complex, with relatively cumbersome steps needed to be performed by the user, and is relatively complex in operation. At the same time, electronic devices must make multiple responses to the user's operations, thereby increasing the burdens on the electronic devices.

BRIEF SUMMARY

In summary, one aspect provides an electronic device, comprising: a processor; a display unit operatively coupled to the processor, the display unit being operative to display one or more applications that have been activated by the processor; a motion sensor coupled to the processor; and wherein the processor operatively ends a running of the one or more applications, if the motion sensor detects a motion of an input device in relation to the electronic device, the motion being in correspondence with a user instruction to end the running one or more applications.

Another aspect provides a method of controlling an electronic device, comprising: activating one or more applications for display on a display unit; detecting a motion of an input device in relation to the electronic device, wherein the motion is in correspondence with a user instruction to end the running one or more applications; and ending the running of the one or more applications.

The foregoing is a summary and thus may contain simplifications, generalizations, and omissions of details; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Figure 1:
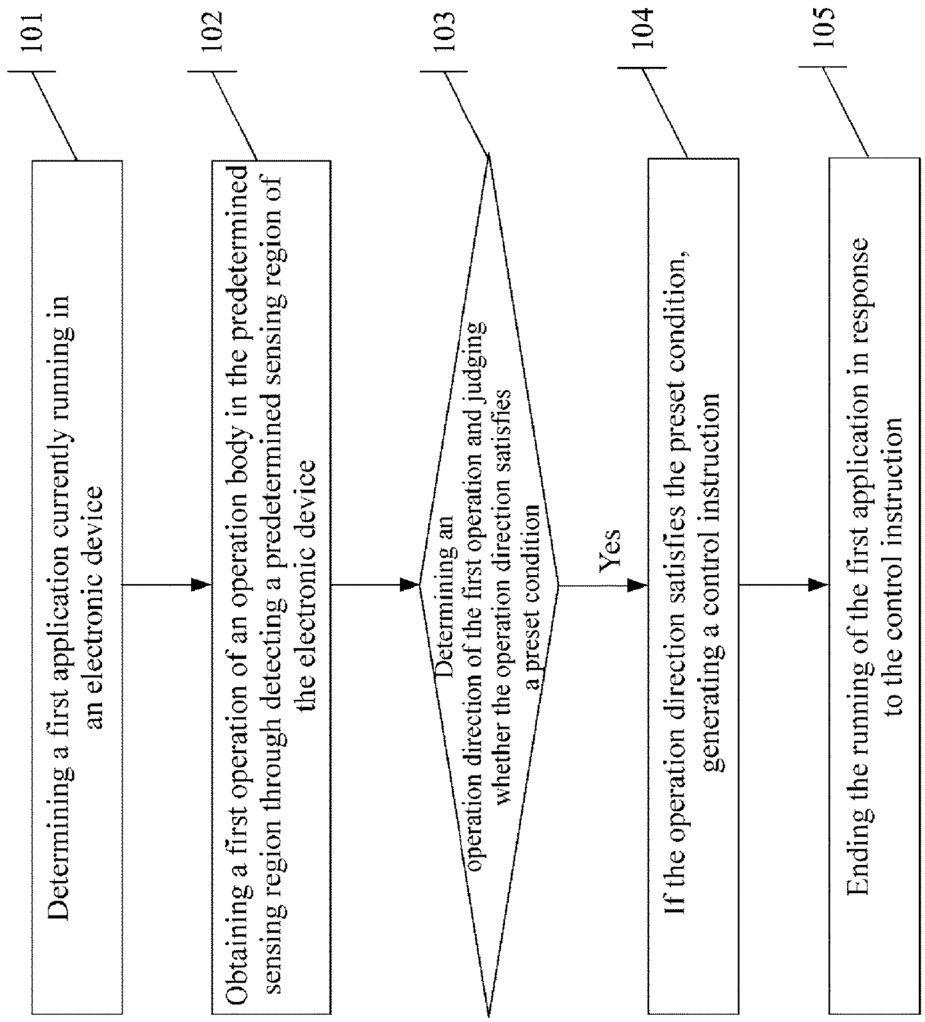
FIG. 1 is a flow diagram of a first information processing method in accordance with an embodiment.

With reference to FIG. 1, an embodiment provides an information processing method which can be applied to an electronic device. The method includes, at 101, determining a first application currently running in an electronic device. The method includes, at 102, obtaining a first operation of an input device in the predetermined sensing region through detecting a predetermined sensing region of the electronic device. The method includes, at 103, determining an operation direction of the first operation and judging whether the operation direction satisfies a preset condition. The method includes, 104, if the operation direction satisfies the preset condition, generating a control instruction. The method includes, at 105, ending the running of the first application in response to the control instruction.

The first application can be any one of the applications installed in the electronic device. For example, the applications may include, but are not limited to, WeChat, Weibo, an XX browser application, a camera application, etc. For example, if the electronic device is currently displaying a display interface corresponding to browser 1, then it can be determined that browser 1 is the first application. Or, for example, the user selects WeChat as the first application when the electronic device is currently running a plurality of applications. Or, for example, if the electronic device is currently running only one application, such as camera 1, then it can be determined that camera 1 is the first application. Or, for example, when currently running a plurality of applications, the electronic device can determine Weibo as the first application randomly from a plurality of applications, and the like. Embodiments are not limited regarding the mode of determining the first application.

The input device can include, but is not limited to, a user's finger, a stylus, etc.

Figure 2:
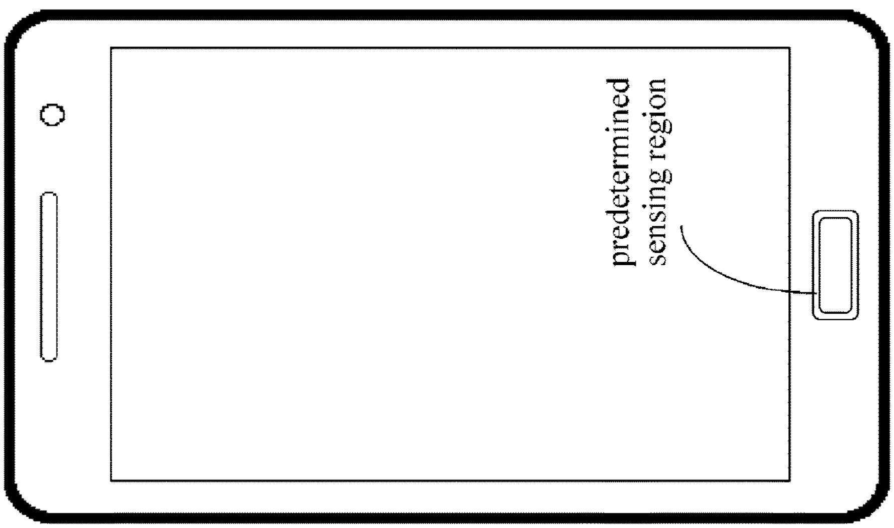
FIG. 2 shows a position of the predetermined sensing region in accordance with an embodiment.

The predetermined sensing region can be a region used to sense the first operation of the operator, and the embodiments are not limited to which region of the electronic device the predetermined sensing region is specifically located at. Any region can be the predetermined sensing region of the embodiments so long as it is able to sense the first operation. For example, as shown in FIG. 2, the predetermined sensing region can be provided at a region where a Home key of the electronic device is located. In this case, the first operation is thus the operation for the Home key.

After receiving the first operation, the operation direction of the first operation can be determined. For example, if the first operation is an operation of sliding rightwards, then the operation direction of the first operation can be a rightward direction. For the mode of determining the operation direction, the embodiments are not limited in this regard. For example, at least two contacting positions of the input device with the predetermined sensing region can be detected, changing trends of the contacting positions are determined based on the at least two contacting positions, and the operation direction of the first operation is determined based on the tendency of the variation.

Figure 3:
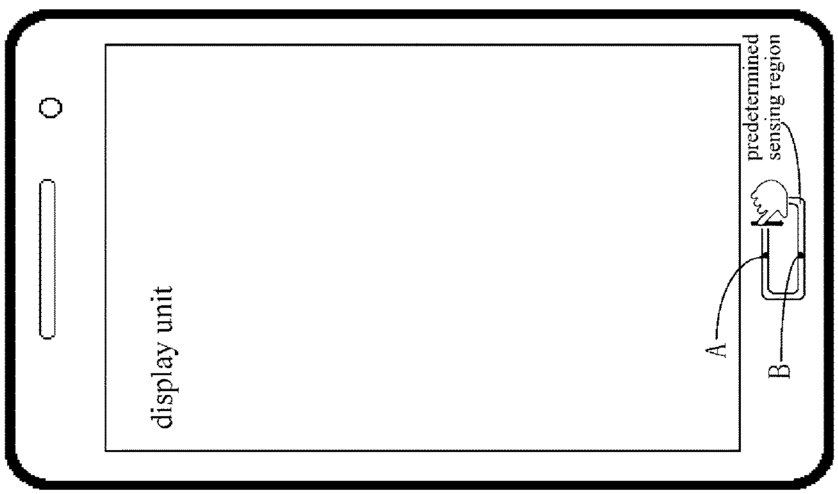
FIG. 3 shows a first mode of operation in accordance with an embodiment.

For example, as shown in FIG. 3, the predetermined sensing region can be a region corresponding to the Home key of the electronic device, wherein a user performs a first operation within the predetermined sensing region through a finger and two contacting positions of the user's finger with the predetermined sensing region are detected, as the positions where point A and point B are present in FIG. 3. Of course, two contacting positions are illustrated herein by way of example and the detected contacting positions may be more than two. If it is detected that the user's finger first contacts the position where point A is and later contacts the position where point B is, then it can be determined that the tendency of variation is from the position where point A is to the position where point B is, and thus can be determined that the direction of the first operation is from point A to point B. In this way, the operation direction of the first operation can be determined more conveniently and accurately, which improves the information processing capability of the electronic device.

After determining the operation direction of the first operation, the electronic device can judge whether the operation direction satisfies a preset condition and the mode of decision will be illustrated below by way of example.

A First Mode of Decision

It can be judged whether the operation direction is a first direction, and if the operation direction is the first direction, it is determined that the operation direction satisfies the preset condition. Wherein the first direction is a direction where a display unit of the electronic device points toward the predetermined sensing region, the predetermined sensing region and the display unit being provided in different regions of the electronic device. That is, once the operation direction of the first operation is determined to be the direction pointing to the predetermined sensing region by the display unit of the electronic device, it is determined that the operation direction satisfies the preset condition.

For example, with continued reference to FIG. 3, the predetermined sensing region can be the region corresponding to the Home key of the electronic device which is different from the region where the display unit is present. The first direction can be a direction pointing to the predetermined sensing region by the display unit, that is, in FIG. 3, the first direction can be a downward direction. If it is detected that the operation direction of the first operation is the downward direction, for instance, the first operation can be a downward sliding operation, then it can be determined that the operation direction of the first operation is the first direction, that is, the operation direction of the first operation satisfies the preset condition.

Figure 4:
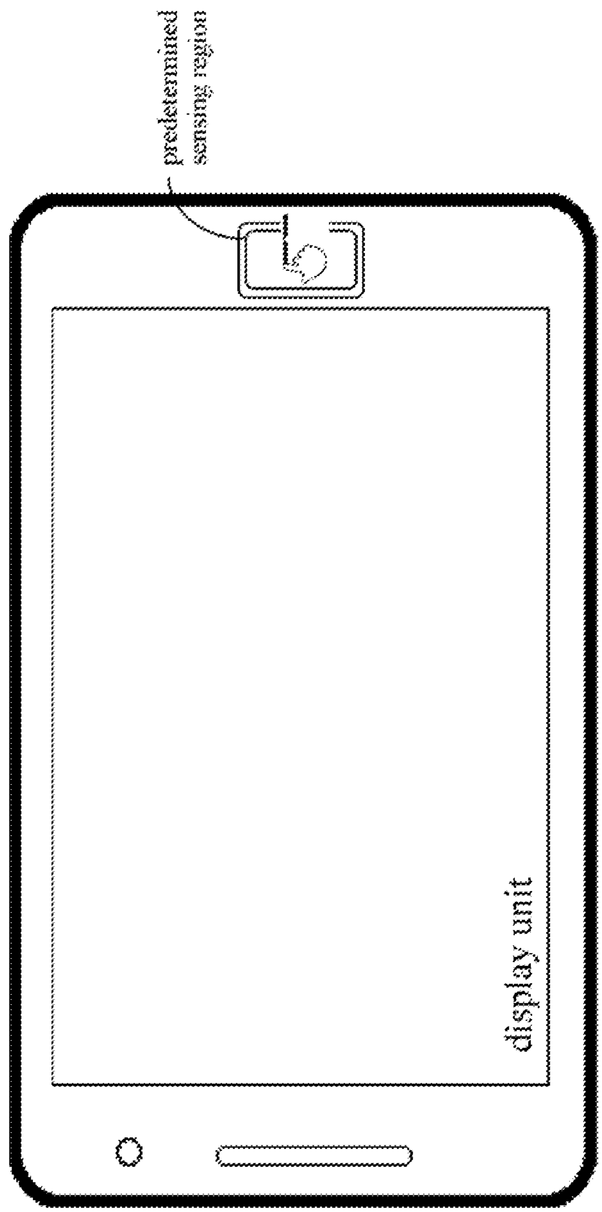
FIG. 4 shows a second mode of operation in accordance with an embodiment.

Or, for example, with reference to FIG. 4, the predetermined sensing region can be the region corresponding to the Home key of the electronic device which is different from the region where the display unit is present. The first direction can be a direction pointing to the predetermined sensing region by the display unit, that is, in FIG. 4, the first direction can be a rightward direction. If it is detected that the operation direction of the first operation is the rightward direction, for instance, the first operation can be a rightward sliding operation, then it can be determined that the operation direction of the first operation is the first direction, that is, the operation direction of the first operation satisfies the preset condition.

With the above mode, the user can achieve the function of ending the first application through a simple sliding operation, which has simple and fast mode of operation and a better user experience, thereby improving the information processing efficiency of the electronic device.

The display direction of the display unit of the electronic device may include lateral and vertical directions etc., as the embodiments are not limited in this regard. For different directions in the display unit, the mode of determining whether the operation direction meets the preset condition may be different.

A Second Mode of Decision

The current display direction of the display unit of the electronic device can be detected, and if the current display direction is a preset first display direction, then it is judged whether the operation direction is the first direction, wherein if the operation direction is the first direction, it is determined that the operation direction satisfies the preset condition. Wherein the first direction is a direction where a display unit points toward the predetermined sensing region, the predetermined sensing region and the display unit being provided in different regions of the electronic device.

For example, the first display direction can be vertical. With continued reference to FIG. 3, the first display direction of the display unit is a vertical display direction, and in this case, the first direction is the direction pointing to the predetermined sensing region by the display unit, i.e., the downward direction. If it is detected that the operation direction of the first operation is also downward, then it can be determined that the operation direction satisfies the preset condition. With such a mode, the user can achieve the function of ending the first application through a simple downward sliding operation under the condition that the display direction of the display unit is a vertical display, which has simple and fast mode of operation and a better user experience, thereby improving the information processing efficiency of the electronic device.

Optionally, if the current display direction of the display unit is a preset second display direction, then it is judged whether the operation direction is the second direction, wherein if the operation direction is the second direction, it is determined that the operation direction satisfies the preset condition. Wherein the second direction is perpendicular to the first direction.

Figure 5:
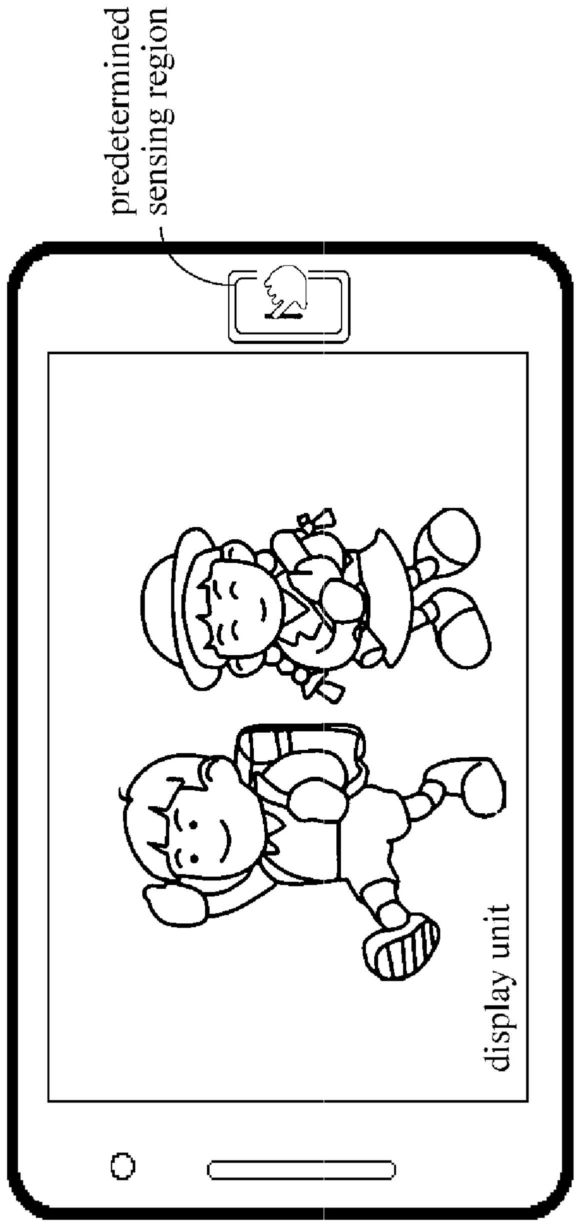
FIG. 5 shows a third mode of operation in accordance with an embodiment.

For example, the second display direction can be lateral. As shown in FIG. 5, the second display direction of the display unit is a lateral display direction, and in this case, since the first direction is the direction pointing to the predetermined sensing region by the display unit, i.e., the rightward direction, the second direction can be the direction perpendicular to the first direction, for instance, the second direction can be the downward direction. If it is detected that the operation direction of the first operation is also downward, for instance, the first operation can be a downward sliding operation, then it can be determined that the operation direction satisfies the preset condition. With such a mode, the user can also achieve the function of ending the first application through a simple downward sliding operation under the condition that the display direction of the display unit is a lateral display, which has simple and fast mode of operation and a better user experience, thereby improving the information processing efficiency of the electronic device.

Optionally, the second direction is perpendicular to the first direction and is consistent with the direction where a display interface of the first application, displayed by the display unit, faces.

That is, as the display direction of the display unit is lateral, the first direction can be the direction pointing to the predetermined sensing region by the display unit, for instance, the first direction can be the rightward direction, and since the second direction is perpendicular to the first direction and the direction that the display unit displays the display interface of the first application should be displayed vertically and downwards at the time of displaying laterally, thus, the second direction is the downward direction. In this way, even in the display mode that the display unit is lateral, the user can also achieve the function of ending the first application through a simple downward sliding operation, which has simple and fast mode of operation and a better user experience, thereby improving the information processing efficiency of the electronic device and also saving the storage space of the electronic device.

After determining that the operation direction of the first operation satisfies the preset condition, the electronic device can generate the control instruction. The running of the first application is able to be ended in response to this control instruction, wherein ending the first application can exit the application completely. Optionally, cache files corresponding to the first application can be cleared in response to the control instruction. That is, not only is the running of the first application able to be ended, but also the cache files corresponding to the first application can be cleared in response to the generated control instruction. In this way, it is able to close the application directly and clear the caches without a series of cumbersome operations of invoking the multi-tasking list by the user and the like, which has simple and convenient operations for the user, and there is also no need for the electronic device to respond to the user's operation many times, which reduces the load of the electronic device.

Figure 6:
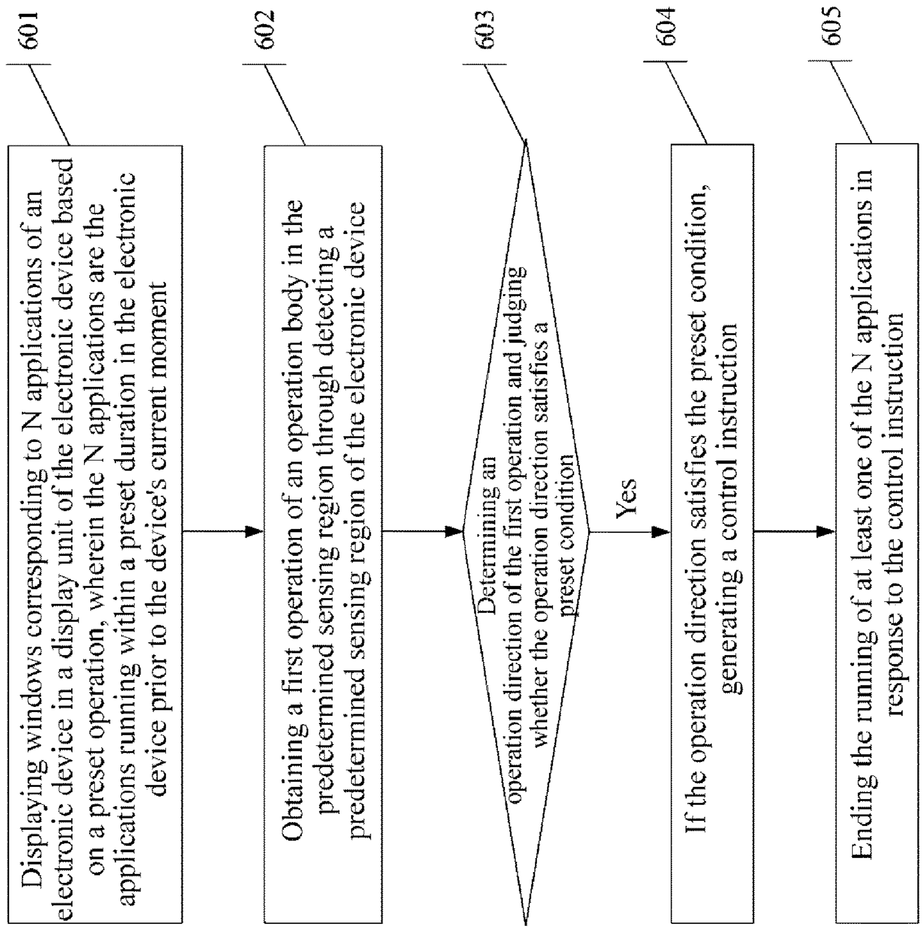
FIG. 6 is a flow diagram of a second information processing method in accordance with an embodiment.

With reference to FIG. 6, an embodiment provides another information processing method which can be applied to an electronic device. The method includes, at 601, displaying windows corresponding to N applications of an electronic device in a display unit of the electronic device based on a preset operation, wherein the N applications are the applications running within a preset duration in the electronic device prior to the device's current moment. The method includes, at 602, obtaining a first operation of an input device in the predetermined sensing region through detecting a predetermined sensing region of the electronic device. The method includes, at 603, determining an operation direction of the first operation and judging whether the operation direction satisfies a preset condition. The method includes, at 604, if the operation direction satisfies the preset condition, generating a control instruction. The method includes, at 605, ending the running of at least one of the N applications in response to the control instruction.

The embodiments in step 602-step 604 are the same with those in step 102-step 104, the same modes and methods will not be repeated below, and for specific details, please refer to the above descriptions.

The preset operation can be the operation of invoking the corresponding windows displaying the currently running N applications. For example, it can be an operation of invoking the multi-tasking list. The embodiments are not limited as to which operation the preset operation is. For example, it could be an operation of double-clicking the Home key and the like.

The preset duration could be any duration, such as 2 hours, 3 hours and the like. For the specific value of the preset duration, it can be set by the electronic device before they leave the factory, it can be set by the users themselves, and can also be modified as required after being set. The embodiments are not limited in this regard.

In the invoked windows corresponding to the N applications, thumbnails of the currently running interfaces corresponding to the N applications respectively can be displayed, or icons of the applications and the like can also be displayed. The user can operate one or more of the N applications within the windows, for instance, the user can invoke one of the applications or close one of the applications, etc. The embodiments are not limited in this regard.

Optionally, it can be judged whether the operation direction is the first direction, and if the operation direction is the first direction, it is determined that the operation direction satisfies the preset condition. Wherein the first direction is a direction where a display unit of the electronic device points toward the predetermined sensing region, the predetermined sensing region and the display unit being provided in different regions of the electronic device.

Optionally, the current display direction of the display unit of the electronic device can be detected, and if the current display direction is a preset first display direction, then it is judged whether the operation direction is the first direction, wherein if the operation direction is the first direction, it is determined that the operation direction satisfies the preset condition. Wherein the first direction is a direction where a display unit points toward the predetermined sensing region, the predetermined sensing region and the display unit being provided in different regions of the electronic device.

Optionally, if the current display direction of the display unit is a preset second display direction, then it is judged whether the operation direction is the second direction, wherein if the operation direction is the second direction, it is determined that the operation direction satisfies the preset condition. Wherein the second direction is perpendicular to the first direction.

Optionally, the second direction is perpendicular to the first direction and is consistent with the direction where windows corresponding to the N applications, displayed by the display unit, face.

Figure 7:
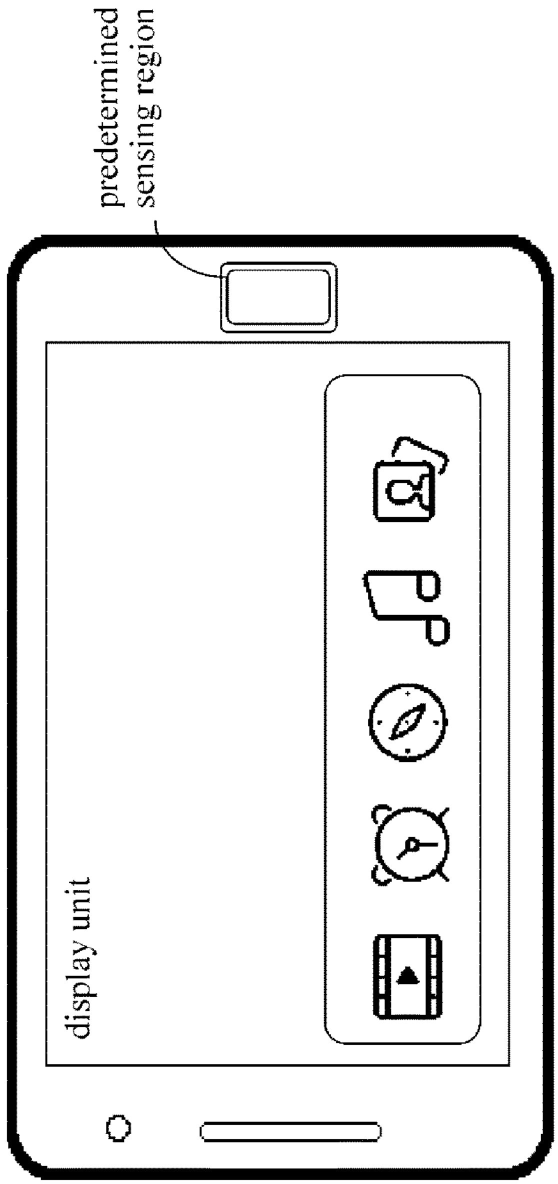
FIG. 7 shows a fourth mode of operation in accordance with an embodiment.

In this method, since the windows corresponding to the N applications running within the preset duration before the current moment have been invoked, then the second direction is perpendicular to the first direction and also needs to be consistent with the direction of the windows corresponding to the N applications. For example, as shown in FIG. 7, the predetermined sensing region can be the region corresponding to the Home key of the electronic device. As the display direction of the display unit is lateral, the first direction can be the direction pointing to the predetermined sensing region by the display unit, that is, the rightward direction. Since the second direction is perpendicular to the first direction and the direction of the window corresponding to the N applications shown in FIG. 7 is displayed vertically and downwards at the time of displaying laterally, the second direction is the downward direction. In this way, even in the display mode that the display unit is lateral, the user can also achieve the function of closing some or all of the applications in the window through a simple downward sliding operation, which has simple and fast mode of operation and a better user experience, thereby improving the information processing efficiency of the electronic device.

Optionally, the running of the first application in the N applications can be ended in response to the control instruction, wherein the window corresponding to the first application is located at a preset position in the windows corresponding to the N applications displayed by the display unit. Or, optionally, running of the N applications can be ended in response to the control instruction.

For example, as shown in FIG. 7, the N applications can be 5 applications, for instance, video, alarm clock, compass, music and contacts respectively. For instance, the preset position can be set as the foremost position in the window, and a first application can be the first application in the window, that is, the video in FIG. 7, then the running of the video application can be ended in response to the control instruction.

In another example, as shown in FIG. 7, the N applications can be 5 applications, for instance, a video, an alarm clock, a compass, music, and contacts, respectively. The running of all the 5 applications can be ended in response to the control instruction.

With the above modes, the user can end one or more applications through a simple sliding operation under the multi-tasking list, wherein the operation is simple and fast, the information processing capability of the electronic device is stronger and the information processing efficiency is higher. Optionally, cache files corresponding to the ended applications can also be cleared in response to the control instruction.

Figure 8:
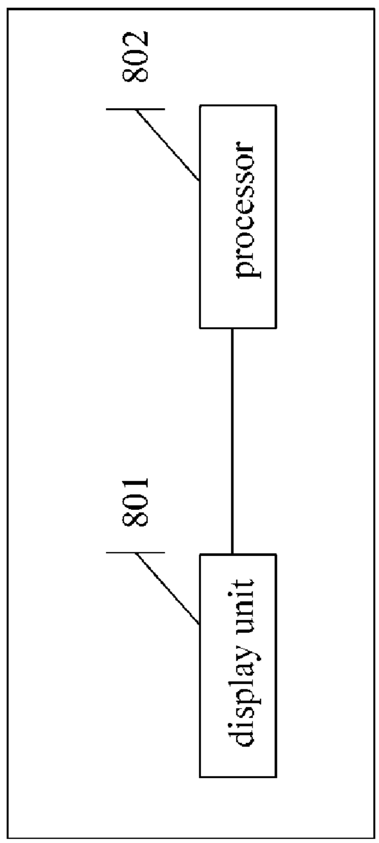
FIG. 8 is a structural schematic diagram of a first electronic device in accordance with an embodiment.

With reference to FIG. 8, an embodiment provides an electronic device that can include a display unit 801. The electronic device can include a processor 802 for determining a first application currently running in an electronic device; obtaining a first operation of an input device in the predetermined sensing region through detecting a predetermined sensing region of the electronic device; determining an operation direction of the first operation and judging whether the operation direction satisfies a preset condition; if the operation direction satisfies the preset condition, generating a control instruction; ending the running of the first application in response to the control instruction.

Optionally, the processor 802 is used to: detect the input device's at least two contacting positions with the predetermined sensing region; determine the changing trends of the contacting positions based on the at least two contacting positions; and determine an operation direction of the first operation based on the changing trends.

Optionally, the processor 802 is used to: judge whether the operation direction is a first direction, wherein the first direction is a direction where the display unit 801 points toward the predetermined sensing region, the predetermined sensing region and the display unit 801 being provided in different regions of the electronic device; if the operation direction is the first direction, determine that the operation direction satisfies the preset condition.

Optionally, the processor 802 is used to: detect a current display direction of the display unit 801 of the electronic device; if the current display direction is a preset first display direction, judge whether the operation direction is a first direction, wherein the first direction is a direction where the display unit 801 points toward the predetermined sensing region, the predetermined sensing region and the display unit 801 being provided in different regions of the electronic device; if the operation direction is the first direction, determine that the operation direction satisfies the preset condition.

Optionally, the processor 802 is also used to: if the current display direction of the display unit 801 is a preset second display direction, judge whether the operation direction is a second direction, wherein the second direction is perpendicular to the first direction; if the operation direction is the second direction, determine that the operation direction satisfies the preset condition.

Optionally, the second direction is perpendicular to the first direction and is consistent with the direction where the display interface of the first application, displayed by the display unit 801, faces.

Optionally, the processor 802 is also used to: clear cache files corresponding to the first application in response to the control instruction.

Figure 9:
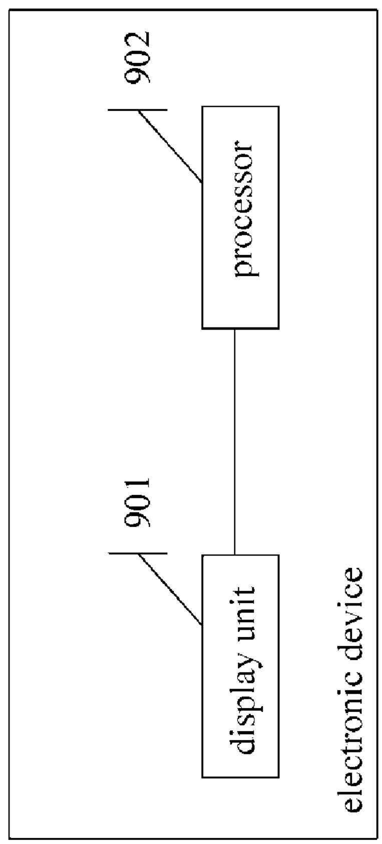
FIG. 9 is a structural schematic diagram of a second electronic device in accordance with an embodiment.

With reference to FIG. 9, an another electronic device that can include a display unit 901. The electronic device can include a processor 902, used to display windows corresponding to N applications of an electronic device in a display unit 901 based on a preset operation, wherein the N applications are the applications running within a preset duration in the electronic device prior to the device's current moment; obtaining a first operation of an input device in the predetermined sensing region through detecting a predetermined sensing region of the electronic device; determining an operation direction of the first operation and judging whether the operation direction satisfies a preset condition; if the operation direction satisfies the preset condition, generating a control instruction; ending the running of at least one of the N applications in response to the control instruction.

Optionally, the processor 902 is used to: judge whether the operation direction is a first direction, wherein the first direction is a direction where the display unit 901 points toward the predetermined sensing region, the predetermined sensing region and the display unit 901 being provided in different regions of the electronic device; if the operation direction is the first direction, determine that the operation direction satisfies the preset condition.

Optionally, the processor 902 is used to: detect a current display direction of the display unit 901 of the electronic device; if the current display direction is a preset first display direction, judge whether the operation direction is a first direction, wherein the first direction is a direction where the display unit 901 points toward the predetermined sensing region, the predetermined sensing region and the display unit 901 being provided in different regions of the electronic device; if the operation direction is the first direction, determine that the operation direction satisfies the preset condition.

Optionally, the processor 902 is also used to: if the current display direction of the display unit 901 is a preset second display direction, judge whether the operation direction is a second direction, wherein the second direction is perpendicular to the first direction; if the operation direction is the second direction, determine that the operation direction satisfies the preset condition.

Optionally, the second direction is perpendicular to the first direction and is consistent with the direction where windows corresponding to the N applications, displayed by the display unit 901, face.

Optionally, the processor 902 is used to: end the running of the first application in the N applications in response to the control instruction, wherein a window corresponding to the first application is located at a preset position in the windows corresponding to the N applications displayed by the display unit 901; or end the running of the N applications in response to the control instruction.

Optionally, the processor 902 is also used to: clear cache files corresponding to the ended applications in response to the control instruction.

Figure 10:
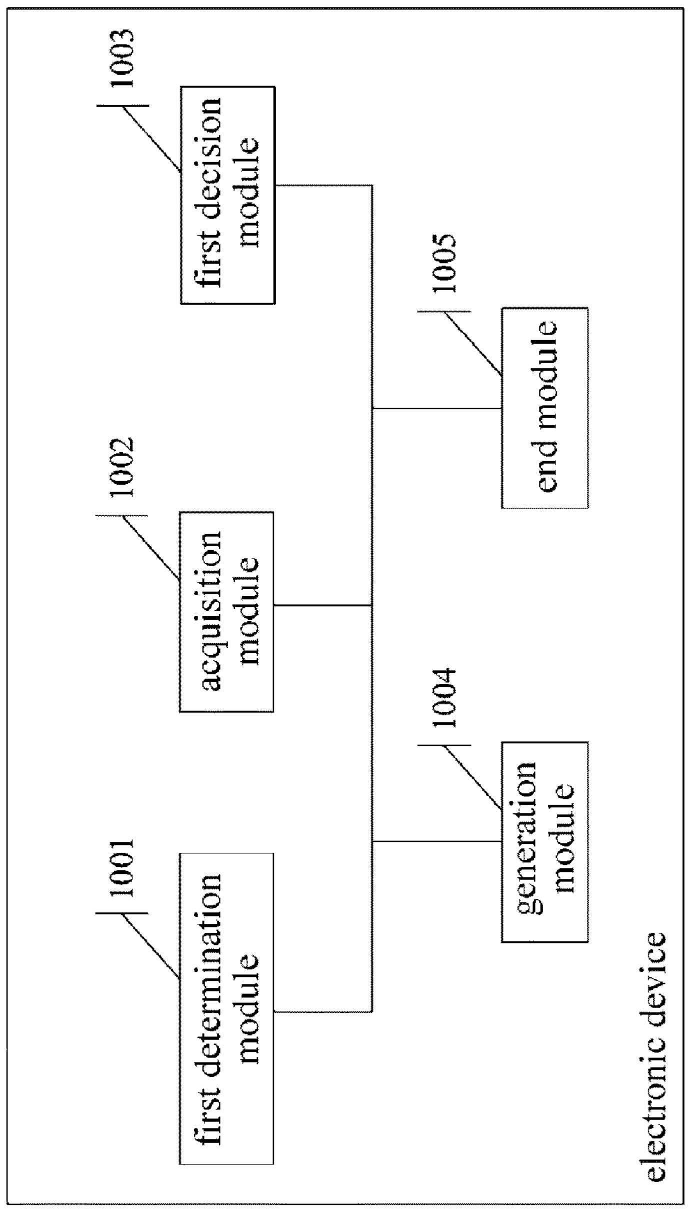
FIG. 10 is a structural schematic diagram of a third electronic device in accordance with an embodiment.

With reference to FIG. 10, an embodiment provides another electronic device that can include: a first determination module 1001, used for determining a first application currently running in an electronic device; an acquisition module 1002, used for obtaining a first operation of an input device in the predetermined sensing region through detecting a predetermined sensing region of the electronic device; a first decision module 1003, used for determining an operation direction of the first operation and judging whether the operation direction satisfies a preset condition; a generation module 1004, used for generating a control instruction if the operation direction satisfies a preset condition; an end module 1005, used for ending the running of the first application in response to the control instruction.

Optionally, the first decision module 1003 is used to: detect the input device's at least two contacting positions with the predetermined sensing region; determine the changing trends of the contacting positions based on the at least two contacting positions; determine an operation direction of the first operation based on the changing trends.

Optionally, the first decision module 1003 is used to: judge whether the operation direction is a first direction, wherein the first direction is a direction where the display unit of the electronic device points toward the predetermined sensing region, the predetermined sensing region and the display unit being provided in different regions of the electronic device; if the operation direction is the first direction, determine that the operation direction satisfies the preset condition.

Optionally, the first decision module 1003 is used to: detect a current display direction of the display unit of the electronic device; if the current display direction is a preset first display direction, judge whether the operation direction is a first direction, wherein the first direction is a direction where the display unit points toward the predetermined sensing region, the predetermined sensing region and the display unit being provided in different regions of the electronic device; if the operation direction is the first direction, determine that the operation direction satisfies the preset condition.

Optionally, the electronic device also includes: a second decision module used to: if the current display direction of the display unit is a preset second display direction, judge whether the operation direction is a second direction, wherein the second direction is perpendicular to the first direction; a second determination module used to: if the operation direction is the second direction, determine that the operation direction satisfies the preset condition.

Optionally, the second direction is perpendicular to the first direction and is consistent with the direction where the display interface of the first application, displayed by the display unit, faces.

Optionally, the electronic device also comprises: a clear module for clearing cache files corresponding to the first application in response to the control instruction.

Figure 11:
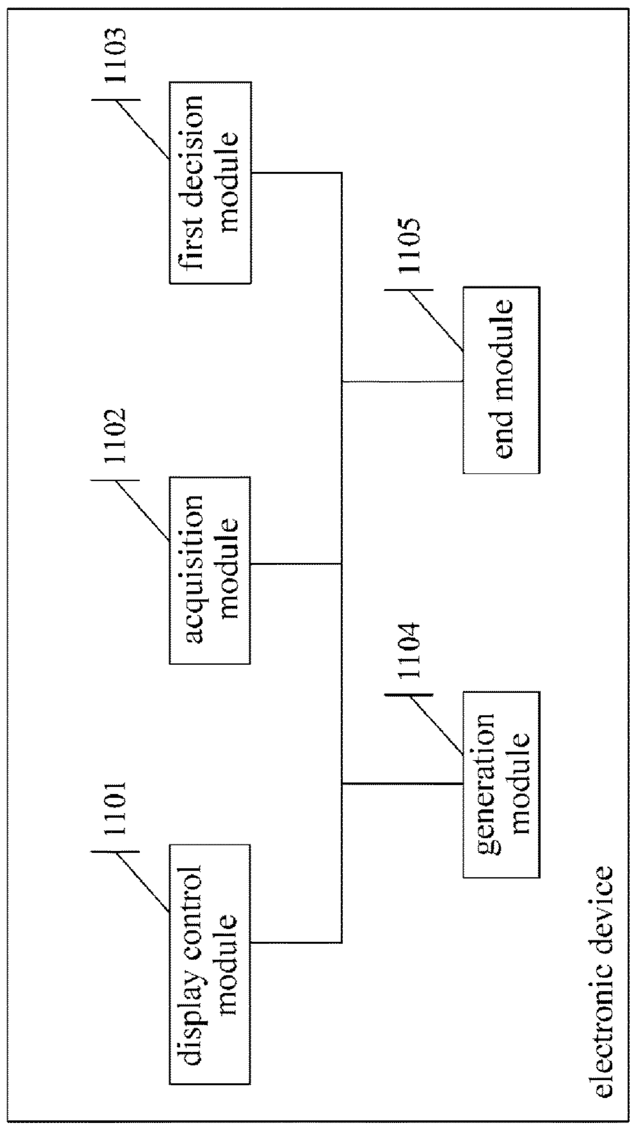
FIG. 11 is a structural schematic diagram of a fourth electronic device in accordance with an embodiment.

With reference to FIG. 11, an embodiment provides an electronic device that can include: a display control module 1101 for displaying windows corresponding to N applications of the electronic device in a display unit of the electronic device based on a preset operation, wherein the N applications are the applications running within a preset duration in the electronic device prior to the device's current moment; an acquisition module 1102, used for obtaining a first operation of an input device in the predetermined sensing region through detecting a predetermined sensing region of the electronic device; a first decision module 1103, used for determining an operation direction of the first operation and judging whether the operation direction satisfies a preset condition; a generation module 1104, used for generating a control instruction if the operation direction satisfies a preset condition; an end module 1105, used for ending the running of at least one of the N applications in response to the control instruction.

Optionally, the first decision module 1103 is used to: judge whether the operation direction is a first direction, wherein the first direction is a direction where the display unit of the electronic device points toward the predetermined sensing region, the predetermined sensing region and the display unit being provided in different regions of the electronic device; if the operation direction is the first direction, determine that the operation direction satisfies the preset condition.

Optionally, the first decision module 1103 is used to: detect a current display direction of the display unit of the electronic device; if the current display direction is a preset first display direction, judge whether the operation direction is a first direction, wherein the first direction is a direction where the display unit points toward the predetermined sensing region, the predetermined sensing region and the display unit being provided in different regions of the electronic device; if the operation direction is the first direction, determine that the operation direction satisfies the preset condition.

Optionally, the electronic device also comprises: a second decision module used to, if the current display direction of the display unit is a preset second display direction, judge whether the operation direction is a second direction, wherein the second direction is perpendicular to the first direction; a second determination module used to, if the operation direction is the second direction, determine that the operation direction satisfies the preset condition.

Optionally, the second direction is perpendicular to the first direction and is consistent with the direction where windows corresponding to the N applications, displayed by the display unit, face.

Optionally, the end module 1105 is used to: end the running of the first application in the N applications in response to the control instruction, wherein a window corresponding to the first application is located at a preset position in the windows corresponding to the N applications displayed by the display unit; or end the running of the N applications in response to the control instruction.

Optionally, the electronic device also comprises: a clear module for clearing cache files corresponding to the ended applications in response to the control instruction.

In embodiments, the user can perform an operation, that is, a first operation, in the predetermined sensing region of the electronic device which can judge whether the operation direction of the first operation satisfies a preset condition after acquiring the first operation, wherein the control instruction is generated if the preset condition is fulfilled and the running of the currently running first application can be ended in response to the control instruction. In this way, it can be achieved only through a simple directional operation if a user wants to close the currently running application completely, wherein the operation is relatively convenient and fast, and the electronic device is able to achieve the function of ending the currently running application with only a single response to the user's operation, which reduces the load of the electronic device, and simultaneously also improves the information processing capability and processing efficiency of the electronic device.

In several embodiments, it should be understood that the disclosed device and method may be implemented in other ways. For example, the above described device embodiments are merely schematic, and the described module or unit division is only a logical division of functions: there can be other ways of dividing in actual implementation. For example, a plurality of units or assemblies can be combined or integrated into another system, or some features can be ignored or not executed. Additionally, mutual coupling or direct coupling, or communication connections as shown or discussed, may be implemented through some interface(s), and indirect coupling or communication connections of device or units may be in an electrical, mechanical, or other form.

The units described as separate components may or may not be separated physically. The components illustrated as units may be or may not be physical units, that is, can be located at one place or can be distributed on a plurality of network units. The object of the present solution of the embodiments can be achieved by selecting some or all of the units, according to actual requirements.

In addition, individual functional units in various embodiments of the present application may be integrated in one processing unit, or individual units may be separate physical existences, or two or more units may be integrated in one unit. The above-described integrated units can be implemented in a form of hardware, and can also be implemented in a form of software function units.

The described integrated units, when being implemented in a form of software function units and sold or used as independent products, can be stored in a computer readable storage medium. Based on this understanding, the technical solution of the present application, or the part contributing to the prior art, or all or part of the technical solution can be substantively embodied in the form of software products. The computer software products are stored in a storage medium including several instructions to cause a computer device (which can be a personal computer, a server, a network device, or the like) or a processor to perform all or some of the steps of the described methods of various embodiments of the present application. The previously mentioned storage medium may include various media that can store program code, such as USB drives, portable hard drives, ROM (read-only memory), RAM (random access memory), magnetic disks, optical disks, and the like. In the context of this document, a storage medium is not a signal and "non-transitory" includes all media except signal media.

Specifically, computer program instructions corresponding to the information processing method in the embodiments, can be stored on storage media such as an optical disk, a hard disk, a USB drive, and the like, and when read or executed by an electronic device, the computer program instructions corresponding to the information processing method in the storage media comprise the following steps: determining a first application currently running in an electronic device; obtaining a first operation of an input device in the predetermined sensing region through detecting a predetermined sensing region of the electronic device; determining an operation direction of the first operation and judging whether the operation direction satisfies a preset condition; if the operation direction satisfies the preset condition, generating a control instruction; and ending the running of the first application in response to the control instruction.

Optionally, when in the process of being executed, the computer instructions corresponding to the step of determining an operation direction of the first operation, which stored in the storage media comprise: detecting the input device's at least two contacting positions with the predetermined sensing region; determining changing trends of the contacting positions based on the at least two contacting positions; and determining an operation direction of the first operation based on the changing trends.

Optionally, when in the process of being executed, the computer instructions corresponding to the step of judging whether the operation direction satisfies a preset condition, which stored in the storage media comprise: judging whether the operation direction is a first direction, wherein the first direction is a direction where a display unit of the electronic device points toward the predetermined sensing region, the predetermined sensing region and the display unit being provided in different regions of the electronic device; if the operation direction is the first direction, determine that the operation direction satisfies the preset condition.

Optionally, when in the process of being executed, the computer instructions corresponding to the step of judging whether the operation direction satisfies a preset condition, which stored in the storage media comprise: detecting a current display direction of the display unit of the electronic device; if the current display direction is a preset first display direction, judging whether the operation direction is a first direction, wherein the first direction is a direction where the display unit points toward the predetermined sensing region, the predetermined sensing region and the display unit being provided in different regions of the electronic device; if the operation direction is the first direction, determining that the operation direction satisfies the preset condition.

Optionally, the storage media also stores some other computer instructions therein that, when in the process of being executed, comprise: if the current display direction of the display unit is a preset second display direction, judge whether the operation direction is a second direction, wherein the second direction is perpendicular to the first direction; if the operation direction is the second direction, determine that the operation direction satisfies the preset condition.

Optionally, the storage media also stores some other computer instructions therein that, when in the process of being executed, comprise: clearing cache files corresponding to the first application in response to the control instruction.

Computer program instructions corresponding to a second information processing method in the embodiments can also be stored on storage media such as an optical disk, a hard disk, a USB drive, and the like, and when read or executed by an electronic device, the computer program instructions corresponding to the information processing method in the storage media comprise the following steps: displaying windows corresponding to N applications of an electronic device in a display unit of the electronic device based on a preset operation, wherein the N applications are the applications running within a preset duration in the electronic device prior to the device's current moment; obtaining a first operation of an input device in the predetermined sensing region through detecting a predetermined sensing region of the electronic device; determining an operation direction of the first operation and judging whether the operation direction satisfies a preset condition; if the operation direction satisfies the preset condition, generating a control instruction; and ending the running of at least one of the N applications in response to the control instruction.

Optionally, when in the process of being executed, the computer instructions corresponding to the step of judging whether the operation direction satisfies a preset condition, which stored in the storage media comprise: judging whether the operation direction is a first direction, wherein the first direction is a direction where a display unit of the electronic device points toward the predetermined sensing region, the predetermined sensing region and the display unit being provided in different regions of the electronic device; if the operation direction is the first direction, determining that the operation direction satisfies the preset condition.

Optionally, when in the process of being executed, the computer instructions corresponding to the step of judging whether the operation direction satisfies a preset condition, which stored in the storage media comprise: detecting a current display direction of the display unit of the electronic device; if the current display direction is a preset first display direction, judging whether the operation direction is a first direction, wherein the first direction is a direction where the display unit points toward the predetermined sensing region, the predetermined sensing region and the display unit being provided in different regions of the electronic device; if the operation direction is the first direction, determining that the operation direction satisfies the preset condition.

Optionally, the storage media also stores some other computer instructions therein that, when in the process of being executed, comprise: if the current display direction of the display unit is a preset second display direction, judge whether the operation direction is a second direction, wherein the second direction is perpendicular to the first direction; if the operation direction is the second direction, determine that the operation direction satisfies the preset condition.

Optionally, when in the process of being executed, the computer instructions corresponding to the step of ending the running of at least one of the N applications in response to the control instruction, which stored in the storage media comprise: end the running of a first application in the N applications in response to the control instruction, wherein a window corresponding to the first application is located at a preset position in the windows corresponding to the N applications displayed by the display unit; or ending the running of the N applications in response to the control instruction.

Optionally, the storage media also stores some other computer instructions therein that, when in the process of being executed, comprise: clearing cache files corresponding to the ended applications in response to the control instruction.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:

a processor;

a display unit operatively coupled to the processor, the display unit being operative to display one or more applications that have been activated by the processor;

a predefined sensing region comprising a motion sensor coupled to the processor, wherein the predefined sensing region is separate and spaced from the display unit; and a memory storing instructions executable by the processor to:

end a running of the one or more applications upon the motion sensor detecting a motion of an input device in relation to the electronic device, the motion being in a direction away from the display unit and in correspondence with a user instruction to end the running of the one or more applications;

detect at least two contacting positions of the input device with the predefined sensing region;

determine changing trends based on contact of the input device with the at least two contacting positions;

determine the operation direction of a first operation based on the changing trends; and end the running of the one or more applications responsive to identifying whether the first operation is associated with the motion.

2. The electronic device of claim 1, wherein the instructions are further executable by the processor to clear cache files corresponding to a first application in response to a control instruction.

3. The electronic device of claim 2, wherein the instructions are further executable by the processor to clear cache files corresponding to the ended applications in response to the control instruction.

4. A method of controlling an electronic device, comprising:

activating one or more applications for display on a display unit;

detecting a motion of an input device in relation to the electronic device, wherein the motion is in a direction away from the display unit and in correspondence with a user instruction provided to a predefined sensing region, separate and spaced from the display unit, to end the running of the one or more applications;

detecting at least two contacting positions of the input device with the predefined sensing region;

determining changing trends based on contact of the input device with the at least two contacting positions;

determining the operation direction of a first operation based on the changing trends;

identifying whether the first operation is associated with the motion; and ending the running of the one or more applications responsive to identifying that the first operation is associated with the motion.

5. The method of claim 4, further comprising clearing cache files corresponding to a first application in response to a control instruction.

6. The method of claim 5, further comprising clearing cache files corresponding to the ended applications in response to the control instruction.

* * * * *